(12) United States Patent
Zheng et al.

(10) Patent No.: US 12,732,748 B2
(45) Date of Patent: Sep. 8, 2026

(54) EYEGLASSES

(71) Applicant: SHENZHEN SHOKZ CO., LTD., Shenzhen (CN)

(72) Inventors: Jinbo Zheng, Shenzhen (CN); Haofeng Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 200 days.

(21) Appl. No.: 18/150,180

(22) Filed: Jan. 4, 2023

(65) Prior Publication Data

US 2023/0156400 A1 May 18, 2023

Related U.S. Application Data

(63) Continuation of application No. PCT/CN2020/139697, filed on Dec. 25, 2020.

(51) Int. Cl.

| | |
|---|---|
| ***H04R 1/46*** | (2006.01) |
| ***G02C 11/00*** | (2006.01) |
| ***H04R 1/02*** | (2006.01) |
| ***H04R 1/08*** | (2006.01) |
| ***H04R 1/40*** | (2006.01) |
| ***H04R 3/00*** | (2006.01) |

(52) U.S. Cl.
CPC ............... *H04R 1/46* (2013.01); *G02C 11/10* (2013.01); *H04R 1/028* (2013.01); *H04R 1/08* (2013.01); *H04R 1/406* (2013.01); *H04R 3/005* (2013.01); *H04R 2420/07* (2013.01)

(58) Field of Classification Search
None
See application file for complete search history.

(56) References Cited

U.S. PATENT DOCUMENTS 9,277,334 B1 * 3/2016 Wong .................. H04R 1/1041
10,455,324 B2 10/2019 Klemme et al.
10,699,691 B1 * 6/2020 Ye .................... G10K 11/17881
(Continued)

FOREIGN PATENT DOCUMENTS

CN 201035260 Y 3/2008
CN 104936121 A 9/2015
(Continued)

OTHER PUBLICATIONS

Google Patents machine English translation of CN 11114227.*
(Continued)

*Primary Examiner* — James K Mooney
(74) *Attorney, Agent, or Firm* — METIS IP LLC

(57) ABSTRACT

The present disclosure provides glasses. The glasses may include a glasses body including a glasses frame and two glasses temples, wherein the two glasses temples may be physically connected to the glasses frame, respectively; and at least one bone conduction microphone configured to convert a vibration signal into an electric signal, wherein the at least one bone conduction microphone may be physically connected to the glasses frame or at least one glasses temple of the two glasses temples, and the at least one bone conduction microphone may be configured to receive vibration signals from the glasses frame, the at least one glasses temple or a user's body.

6 Claims, 6 Drawing Sheets

(56) References Cited

U.S. PATENT DOCUMENTS

| | | | | |
|---|---|---|---|---|
| 10,701,480 | B1 * | 6/2020 | Yang | G02C 5/14 |
| 2008/0008344 | A1 | 1/2008 | Wakabayashi et al. | |
| 2009/0002626 | A1 | 1/2009 | Wakabayashi | |
| 2010/0119086 | A1 | 5/2010 | Fukuda | |
| 2011/0224481 | A1 | 9/2011 | Lee et al. | |
| 2014/0161287 | A1 * | 6/2014 | Liu | H04R 17/02 381/151 |
| 2016/0246076 | A1 * | 8/2016 | Wei | G02C 11/10 |
| 2017/0026744 | A1 | 1/2017 | Farzbod et al. | |
| 2019/0045298 | A1 * | 2/2019 | Klemme | A61F 11/04 |
| 2020/0092633 | A1 | 3/2020 | Zhang et al. | |
| 2020/0100014 | A1 * | 3/2020 | Cai | H04R 1/105 |
| 2020/0138518 | A1 * | 5/2020 | Lang | A61B 17/1666 |
| 2020/0194028 | A1 | 6/2020 | Lipman | |
| 2022/0128821 | A1 * | 4/2022 | Hatfield | H04R 25/606 |
| 2022/0189497 | A1 * | 6/2022 | Rui | H04R 1/1083 |

FOREIGN PATENT DOCUMENTS

| | | | | |
|---|---|---|---|---|
| CN | 107424481 A | | 12/2017 | |
| CN | 107889036 A | | 4/2018 | |
| CN | 207718105 U | | 8/2018 | |
| CN | 208172380 U | | 11/2018 | |
| CN | 109765699 A | | 5/2019 | |
| CN | 109960062 A | | 7/2019 | |
| CN | 110018579 A | | 7/2019 | |
| CN | 111131988 A | * | 5/2020 | G01H 11/06 |
| CN | 111142274 A | * | 5/2020 | G02C 11/06 |
| CN | 210442589 U | | 5/2020 | |
| CN | 111654775 A | | 9/2020 | |
| CN | 111935573 A | | 11/2020 | |
| JP | S5976189 U | | 5/1984 | |
| JP | H0865781 A | | 3/1996 | |
| JP | H08298694 A | | 11/1996 | |
| JP | 2020036207 A | | 3/2020 | |
| WO | 2014016468 A1 | | 1/2014 | |
| WO | 2016129717 A1 | | 8/2016 | |
| WO | 2019000781 A1 | | 1/2019 | |
| WO | 2019117806 A1 | | 6/2019 | |
| WO | 2019178557 A1 | | 9/2019 | |
| WO | 2020111606 A1 | | 6/2020 | |

OTHER PUBLICATIONS

Notice of Rejection in Japanese Application No. 2023513206 mailed on Apr. 8, 2024, 10 pages.

The Office Action in Russian Application No. 2023100869 mailed on Jul. 25, 2023, 14 pages.

International Search Report in PCT/CN2020/139697 mailed on Aug. 30, 2021, 8 pages.

Written Opinion in PCT/CN2020/139697 mailed on Aug. 30, 2021, 6 pages.

The Extended European Search Report in European Application No. 20966666.8 mailed on Aug. 16, 2023, 11 pages.

Decision to Grant a Patent for Invention in Japanese Application No. 2023513206 mailed on Oct. 7, 2024, 5 pages.

* cited by examiner

EYEGLASSES

CROSS-REFERENCE TO RELATED APPLICATION

This application is a continuation of International Application No. PCT/CN2020/139697, filed on Dec. 25, 2020, the entire contents of which are hereby incorporated by reference.

TECHNICAL FIELD

The present disclosure relates to the field of acoustics, and in particular, to glasses including a bone conduction microphone.

BACKGROUND

A microphone is generally an open-ear microphone based on air conduction. Although good sound quality can be obtained using the microphone, the external background sound source cannot be isolated, and in a conversation in a noisy environment, the ambient noise cannot be filtered, which may cause an inconvenience to a user. Compared with the air conduction microphone, a bone conduction microphone has stronger anti-noise ability because it can detect the vibration of the user's voice through bone conduction due to a direct or indirect contact with the human body. However, at present, most bone conduction microphones have a limited range of application and are inconvenient to wear. Therefore, the present disclosure provides glasses integrated with the bone conduction microphone.

SUMMARY

One embodiment of the present disclosure provides glasses. The glasses may include a glasses body including a glasses frame and two glasses temples, wherein the two glasses temples may be physically connected to the glasses frame, respectively; and at least one bone conduction microphone configured to convert a vibration signal into an electric signal, wherein the at least one bone conduction microphone may be physically connected to the glasses frame or at least one glasses temple of the two glasses temples, and the at least one bone conduction microphone may be configured to receive vibration signals from the glasses frame, the at least one glasses temple or a user's body.

In some embodiments, when the user wears the glasses, the at least one bone conduction microphone may not be in contact with the user's body.

In some embodiments, the at least one bone conduction microphone may be disposed near a position of the glasses frame that is in contact with the user's body.

In some embodiments, the at least one bone conduction microphone may be disposed near a position of the at least one glasses temple that is in contact with the user's body.

In some embodiments, the at least one bone conduction microphone may be disposed near a connection between the glasses frame and the at least one glasses temple.

In some embodiments, the at least one bone conduction microphone may include a vibration unit, the vibration unit may be disposed parallel to a contact surface of the glasses frame or the at least one glasses temple that is in contact with the user's body.

In some embodiments, the vibration unit of the bone conduction microphone may be a single-axis acceleration sensor or a multi-axis acceleration sensor.

In some embodiments, the two glasses temple may include a first glasses temple and a second glasses temple, and the at least one bone conduction microphone may include at least one first bone conduction microphone and at least one second bone conduction microphone; wherein the at least one first bone conduction microphone may be disposed on the first glasses temple, and the at least one second bone conduction microphone may be disposed on the second glasses temple.

In some embodiments, the at least one first bone conduction microphone and the at least one second bone conduction microphone may be both wireless bone conduction microphones.

In some embodiments, the two glasses temple may include a contact surface that is in direct contact with the user, and a pressure of the contact surface to the user's body may be larger than 0.1 N.

In some embodiments, the pressure of the contact surface to the user's body may be larger than 0.2 N.

In some embodiments, the pressure of the contact surface to the user's body may be larger than 0.6 N.

In some embodiments, the at least one bone conduction microphone may be elastically connected to the at least one glasses temple or the glasses frame.

In some embodiments, when the user wears the glasses, the at least one bone conduction microphone may be in contact with the user's body such that the at least one bone conduction microphone receives the vibration signal of the user's body.

In some embodiments, a vibration unit of the at least one bone conduction microphone may be disposed parallel to a contact surface between the glasses frame or the at least one glasses temple and the user's body.

In some embodiments, the at least one glasses temple or the glasses frame may include an installation cavity for accommodating the at least one bone conduction microphone.

In some embodiments, the at least one bone conduction microphone may be connected to a side wall of the installation cavity through an elastic element.

In some embodiments, an elastic layer may be disposed between the at least one bone conduction microphone and the installation cavity.

BRIEF DESCRIPTION OF THE DRAWINGS

The present disclosure is further illustrated in terms of embodiments. These embodiments are described in detail with reference to the drawings. These embodiments are not limiting, and in these embodiments, the same numbers refer to the same structures, wherein.

DETAILED DESCRIPTION

Figure 1:
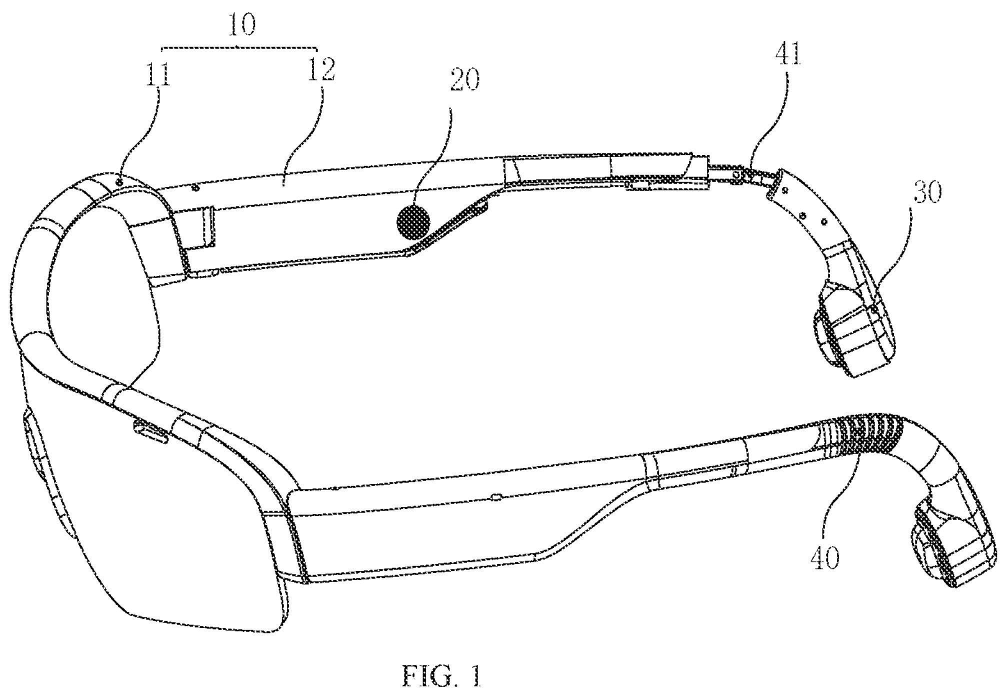
FIG. 1 is a schematic diagram illustrating an exemplary structure of glasses provided according to some embodiments of the present disclosure.

In order to illustrate the technical solutions related to the embodiments of the present disclosure, the drawings used to describe the embodiments are briefly introduced below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

FIG. 1 is a schematic diagram illustrating an exemplary structure of glasses according to some embodiments of the present disclosure.

As shown in FIG. 1, the glasses may include a glasses body 10 and at least one bone conduction microphone 20. The glasses body 10 may include components such as a glasses frame 11, glasses temple(s) 12, etc. In some embodiments, the glasses body 10 may include various types of glasses such as nearsighted glasses, farsighted glasses, sunglasses, 3D glasses, virtual reality (VR)/augmented reality (AR) glasses, etc., which are not limited herein.

In some embodiments, the glasses frame 11 may be physically connected to the glasses temple(s) 12. Exemplary physical connections may include a hinged connection, a snap-fit connection, a welded connection, an integrated molding, etc. For example, when the glasses temple(s) 12 is connected to the glasses frame 11 through the hinged connection, the glasses temple(s) 12 may rotate around a connection between the glasses frame 11 and the glasses temple(s) 12 such that the glasses temple(s) 12 may be folded or unfolded relative to the glasses frame 11. As another example, when the glasses temple(s) 12 is connected to the glasses frame 11 through the hinged connection or the snap-fit connection, the glasses temple(s) 12 may be detachable relative to the glasses frame 11 such that a user may repair or replace the glasses temple(s) 12. As a further example, when the glasses frame 11 is connected to the glasses temple(s) 12 through the welded connection or the integrated molding, the glasses temple(s) 12 may be fixed relative to the glasses frame 11 without being folded or unfolded. In some embodiments, the glasses temple(s) 12 may further include a telescopic structure (not shown in FIG. 1). When wearing the glasses, the user may adjust a length of the glasses temple(s) 12 through the telescopic structure such that the glasses temple(s) 12 may adapt to different head shapes of different users. In the embodiments of the present disclosure, the telescopic structure may refer to a structure capable of adjusting a length. For example, in some embodiments, the telescopic structure may include a telescopic rod structure.

The bone conduction microphone 20 may be a sound pickup device (i.e., a voice collection device) capable of converting a vibration signal into an electric signal. The vibration signal may refer to a signal generated by a vibration of the user's body part when the user speaks. To facilitate understanding, the bone conduction microphone may be understood as a microphone device that is sensitive to a bone conduction sound transmitted by the vibration, but is insensitive to an air conduction sound transmitted by air. The bone conduction microphone 20 may be disposed on the glasses body 10, for example, on a portion of the glasses temple(s) 12 or the glasses frame 11. In some embodiments, when the user wears the glasses, the bone conduction microphone 20 may not be in direct contact with the user's body. A vibration signal (e.g., vibrations of the user's face) generated when the user speaks may be transmitted to the glasses frame 11 and/or the glasses temple(s) 12. Then the glasses frame 11 and/or the glasses temple(s) 12 may transmit the vibration signal to the bone conduction microphone 20, and the bone conduction microphone may further convert the vibration signal of the user's body into the electric signal containing voice information. In some embodiments, when the user wears the glasses, the bone conduction microphone 20 may be in direct contact with the human body, and the vibration signal generated when the user speaks may be directly transmitted to the bone conduction microphone 20. In some embodiments, an inside of the glasses temple(s) 12 or the glasses frame 11 may include a hollow structure, and a control circuit or a signal transmission circuit relating to the bone conduction microphone 20 may be disposed in the hollow structure.

Referring to FIG. 1, in some embodiments, the glasses may further include a speaker assembly 30. The speaker assembly 30 may be configured to convert the electric signal with sound information into a sound. In some embodiments, the speaker assembly 30 may be a bone conduction speaker connected to the glasses temple(s) 12 through a hinge assembly 40. As shown in FIG. 1, the bone conduction speaker may be connected to an end of the glasses temple(s) 12 (i.e., an end away from the glasses frame 11). When the user wears the glasses, the bone conduction speaker may be attached to a back of the user's ear, and transmit the sound to the user through bone conduction. The hinge assembly 40 may further include a connecting wire 41. The connecting wire 41 may be a connecting piece having an electrical connection and/or a mechanical connection. In some alternative embodiments, the speaker assembly 30 may be an air conduction speaker disposed at any position on the glasses temple(s) 12. For example, the air conduction speaker may be disposed in a middle part of the glasses temple(s) 12. When the user wears the glasses, the air conduction speaker may transmit the sound to the user by air conduction through one or more sound guiding holes facing the user's ear canal. In some embodiments, a control circuit or a signal transmission circuit relating to the speaker assembly 30 may be disposed within the hollow structure inside the glasses temple(s) 12.

In some embodiments, the user's body may be usually in direct contact with the glasses temple(s) 12 or the glasses frame 11 when the user wears the glasses. While when the glasses body 10 is rigidly connected to the bone conduction microphone 20, the vibration signal when the user speaks may be effectively transmitted to the bone conduction microphone 20 through the glasses body 10 (e.g., the glasses frame 11, the glasses temple(s) 12) without through a direct connection between the bone conduction microphone 20 and the user's body. In such cases, the bone conduction microphone 20 may be disposed on the glasses body 10 at a position not in contact with the user's body, and the bone conduction microphone 20 may be rigidly connected to the glasses body 10. Exemplary rigid connections may include a fixed connection such as a bonded connection, a welded connection, an integrated molding, etc., or may include a detachable connection such as a snap-fit connection, a bolted connection, etc. A connection manner between the bone conduction microphone 20 and the glasses body 10 may be adjusted adaptively according to the specific situation, which is not limited herein. In some embodiments, the bone conduction microphone 20 may be disposed on an outer surface or inside of the glasses frame 11 or the glasses temple(s) 12. For example, in some embodiments, when the bone conduction microphone 20 is disposed on the outer surface of the glasses frame 11, the bone conduction microphone 20 may be disposed on a side wall of the glasses frame 11 or the glasses temple(s) 12 that is away from the user's body. As another example, the bone conduction microphone 20 may be disposed on a side wall of the glasses frame 11 or the glasses temple(s) 12 facing the user's body, and a distance between the side wall and the user's body may be larger than a height (or a thickness) of the bone conduction microphone 20. As a further example, in some embodiments, the glasses frame 11 or the glasses temple(s) 12 may include an installation cavity (not shown in FIG. 1), the installation cavity may be configured to accommodate the bone conduction microphone 20. The bone conduction microphone 20 may extend or not extend out of the installation cavity. In such cases, the bone conduction microphone 20 may not be in contact with the user's body when the user wears the glasses.

Figure 2:
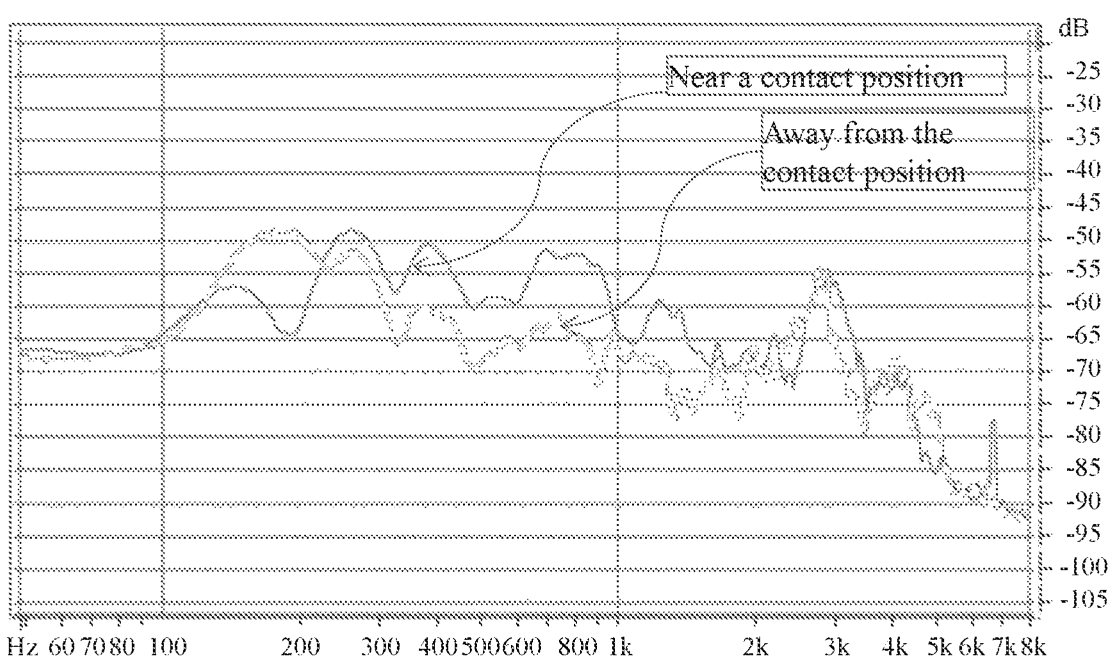
FIG. 2 is a schematic diagram illustrating exemplary frequency response curves corresponding to different installation positions of a bone conduction microphone according to some embodiments of the present disclosure.

FIG. 2 is a schematic diagram illustrating exemplary frequency response curves corresponding to different installation positions of a bone conduction microphone according to some embodiments of the present disclosure. As shown in FIG. 2, in a mid-high frequency band (e.g., 200 Hz-2000 Hz), a vibration signal received by the bone conduction microphone when the bone conduction microphone is disposed near a position of the glasses body (e.g., a glasses temple or a glasses frame) that is in contact with the user's body (e.g., the "near a contact position" shown in FIG. 2) may be obviously larger than the vibration signal received by the bone conduction microphone when the bone conduction microphone is disposed far from the position of the glasses body that is in contact with the user's body (e.g., the "away from the contact position" shown in FIG. 2). In some embodiments, to improve quality of the vibration signal received by the bone conduction microphone, the bone conduction microphone may be disposed near the position of the glasses body that is in contact with the user's body.

Figure 3:
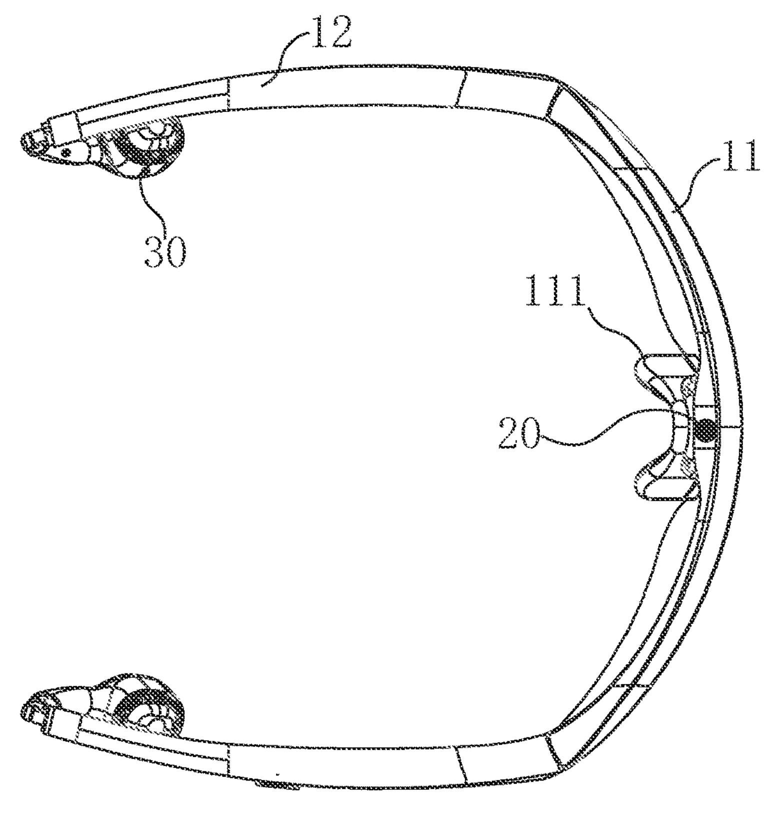
FIG. 3 is a schematic diagram illustrating an exemplary installation position of a bone conduction microphone according to some embodiments of the present disclosure.

In some embodiments, to improve a transmission effect of the bone conduction signal, at least one bone conduction microphone may be disposed near a position of the glasses frame that is in contact with the user's body. For example, as shown in FIG. 3, in some embodiments, the glasses frame 11 may include a nose pad 111 that is in contact with the human body. The nose pad 111 may refer to a structure of the glasses frame 11 that abuts against the user's nose when the user wears the glasses. In some embodiments, the bone conduction microphone 20 may be disposed near the nose pad 111. It may be understood that since the nose pad of the glasses frame is in direct contact with the user's body when the user wears the glasses, the vibration signal generated when the user speaks or the user's body vibrates may be directly transmitted to the bone conduction microphone 20 through the nose pad of the glasses frame. In some embodiments, when the user wears the glasses, the glasses frame 11 may be attached to the user's body (e.g., around the eyes), and the glasses frame 11 may cover the skin around the user's eyes. In such cases, the bone conduction microphone 20 may be directly disposed on the glasses frame 11, and the vibration signal generated when the user speaks or the user's body vibrates may be directly transmitted to the bone conduction microphone 20 through the glasses frame 11.

Figure 4:
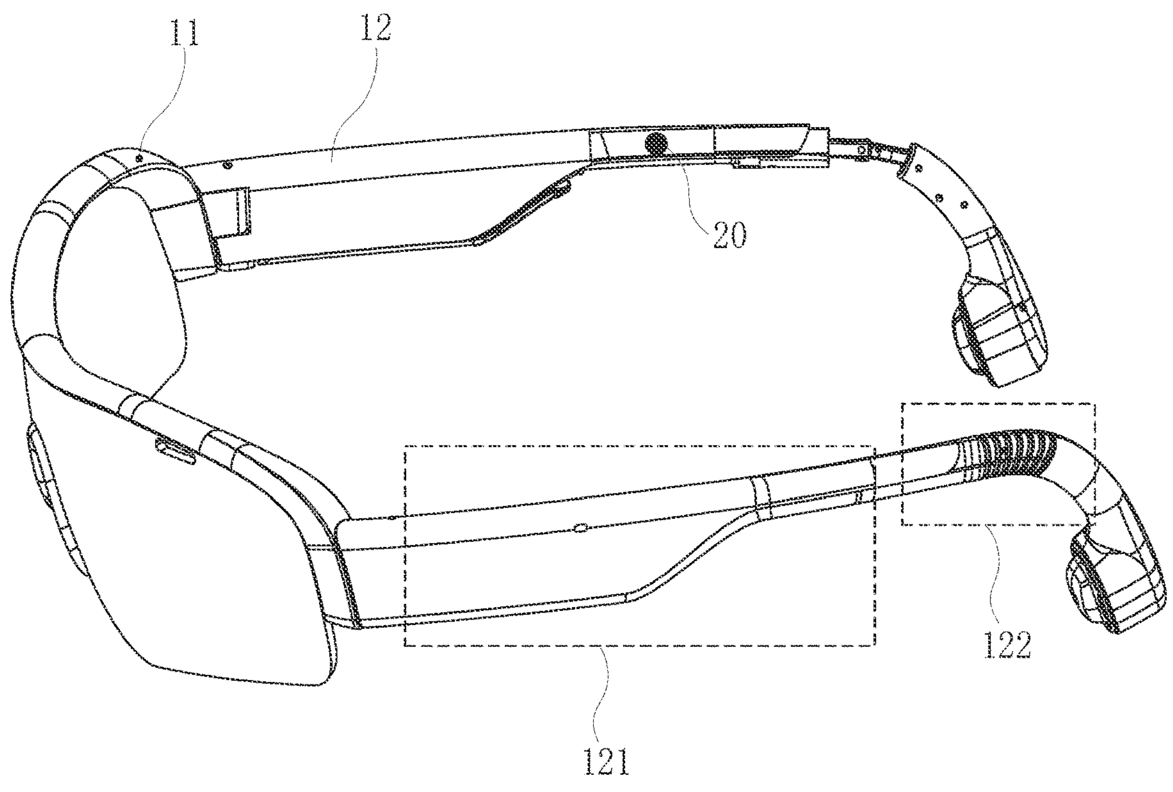
FIG. 4 is a schematic diagram illustrating an exemplary installation position of a bone conduction microphone according to some other embodiments of the present disclosure.

In some embodiments, to improve a transmission effect of the vibration signal, the at least one bone conduction microphone 20 may be disposed near a position of the glasses temple that is in contact with the user's body. As shown in FIG. 4, when the user wears the glasses, a position of the glasses temple(s) 12 that is away from the glasses frame 11 may be usually in direct contact with the human body. For example, when the user wears the glasses, the position of the glasses temple(s) 12 that is in contact with the user's body may refer to a partial region 121 of the glasses temple near a region from the temple to the ear. As another example, the position of the glasses temple(s) 12 that is in contact with the user's body may refer to a bending region 122 of the glasses temple that is away from the glasses frame 11. When the user wears the glasses, the bending region 122 may be located above the user's auricle. In some embodiments, to improve the quality of the vibration signal transmitted from the glasses temple(s) 12 to the bone conduction microphone 20, the at least one bone conduction microphone 20 may be disposed on the partial region 121 of the glasses temple near the region from the temple to the ear, or a position near the bending region 122.

Figure 5:
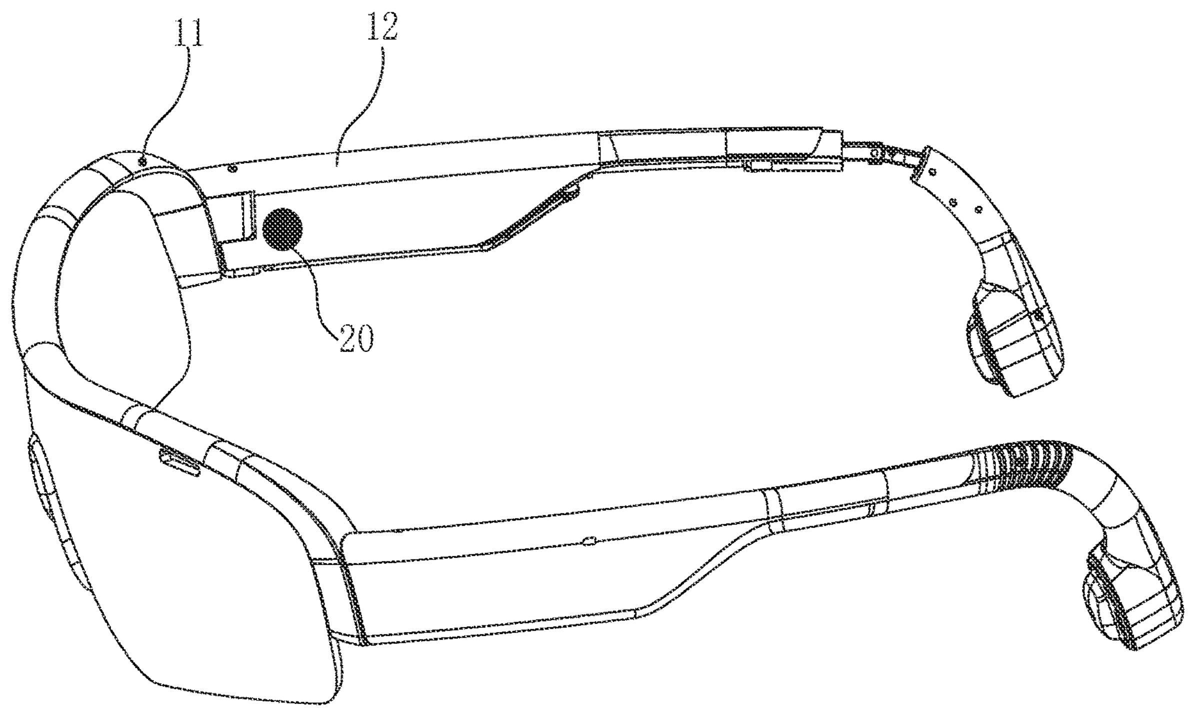
FIG. 5 is a schematic diagram illustrating an exemplary installation position of a bone conduction microphone according to some other embodiments of the present disclosure.

As shown in FIG. 5, in some embodiments, there may be limited space near the position of the glasses temple(s) 12 that is in contact with the user's body and the position of the glasses frame 11 that is in contact with the human body. And the bone conduction microphone 20 may receive the vibration signal from the glasses frame 11 and the glasses temple(s) 12 at the same time when the bone conduction microphone 20 is disposed near a connection between the glasses frame 11 and the glasses temple(s) 12. In such cases, in some embodiments, the bone conduction microphone 20 may be disposed near the connection between the glasses frame 11 and the glasses temple(s) 12.

It should be noted that, in some embodiments, the installation position of the bone conduction microphone 20 may also be determined according to a connection manner between the glasses frame 11 and the glasses temple(s) 12, and an elastic strength of the glasses frame 11 or the glasses temple(s) 12. For example, when a connection strength between the glasses frame 11 and the glasses temple(s) 12 is low, and the elastic strength of the glasses temple(s) 12 or the glasses frame 11 is low, the bone conduction microphone 20 may be disposed near the position of glasses frame 11 that is in contact with the user's body or the position of the glasses temple(s) 12 that is in contact with the user's body, thereby improving the quality of the vibration signal of the user's body transmitted to the bone conduction microphone 20. The connection strength between the glasses frame 11 and the glasses temple(s) 12 may refer to properties such as a tensile strength, a bending load, a compressive load, a torsional load, etc. that the glasses frame and the glasses temple(s) may bear when the glasses frame is connected to the glasses temple. The above-mentioned installation position of the bone conduction microphone 20 are merely provided for the purposes of illustration, and the installation position of the bone conduction microphone is not limited to the positions shown in FIGS. 3-5. The installation position of the microphone may include, but is not limited to the several situations listed above. For example, when the glasses frame 11 is tightly connected to the glasses temple(s) 12, and the elastic strengths of the glasses temple(s) 12 and the glasses frame 11 are relatively high, the bone conduction microphone may be arbitrarily disposed to ensure that the bone conduction microphone may receive vibration signals with good quality.

Figure 6:
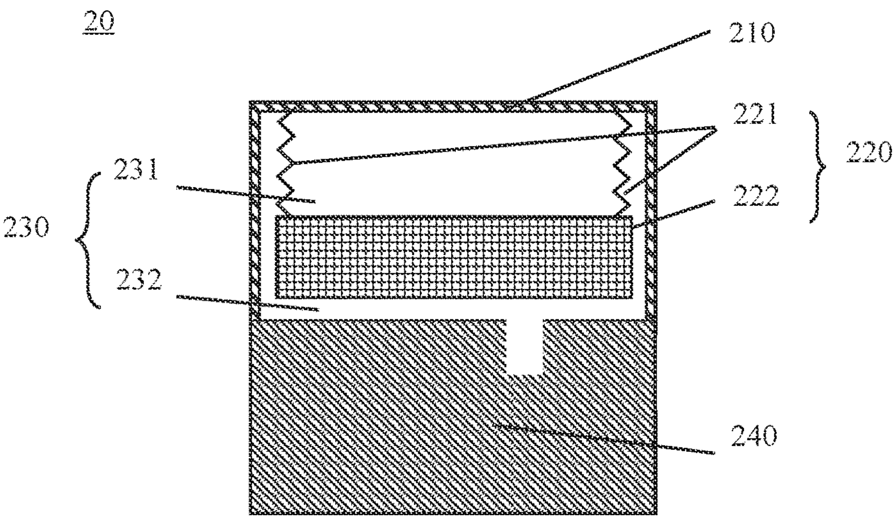
FIG. 6 is a schematic diagram illustrating an exemplary structure of a bone conduction microphone according to some embodiments of the present disclosure.

FIG. 6 is a schematic diagram illustrating an exemplary structure of a bone conduction microphone according to some embodiments of the present disclosure.

As shown in FIG. 6, in some embodiments, the bone conduction microphone 20 may include a housing structure 210, an acoustic transducer 240, and a vibration unit 220. A shape of the bone conduction microphone 20 may include regular shapes such as a cuboid, a cylinder, etc., or irregular shapes. In some embodiments, the housing structure 210 may be physically connected to the acoustic transducer 240. The housing structure 210 and the acoustic transducer 240 may be used as a package structure of the bone conduction microphone 20. In some embodiments, the physical connection may include a hinged connection, a snap-fit connection, a welded connection, an integrated molding, etc. In some embodiments, the housing structure 210 and the acoustic transducer 240 may constitute a package structure with a first acoustic cavity 230. The vibration unit 220 may be disposed within the first acoustic cavity 230 of the package structure. In some embodiments, the vibration unit 220 may divide the first acoustic cavity 230 into a second acoustic cavity 231 and a third acoustic cavity 232. The third acoustic cavity 232 may be in an acoustic communication with the acoustic transducer 240. In some embodiments, the second acoustic cavity 231 may be an acoustically sealed cavity.

In some embodiments, the vibration unit 220 may include a quality element 222 and an elastic element 221. In some embodiments, the quality element 222 may be connected to the housing structure 210 through the elastic element 221. In some embodiments, the elastic element 221 may be disposed on a side of the quality element 222 that is away from the acoustic transducer 240. One end of the elastic element 221 may be connected to the housing structure 210, and the other end of the elastic element 221 may be connected to the quality element 222. In some embodiments, the elastic element 221 may be disposed on a peripheral side of the quality element 222. An inner side of the elastic element 221 may be connected to the peripheral side of the quality element 222, and an outer side of the elastic element 221 or a side away from the acoustic transducer 240 may be connected to the housing structure 210. In some embodiments, the quality element 222 may be connected to the acoustic transducer 240 through the elastic element 221. In some embodiments, the elastic element 221 may have a shape of a round tube, a square tube, a special-shaped tube, a ring, a flat plate, etc. In some embodiments, a material of the elastic element may be a material capable of elastic deformation, such as a silica gel, a metal, a rubber, etc. In the embodiments of the present disclosure, the elastic element 221 may be more likely to be elastically deformed than the housing structure 210, such that the vibration unit 220 may move relative to the housing structure 210.

The bone conduction microphone 20 may convert an external vibration signal into an electric signal. In some embodiments, the external vibration signal may include a vibration signal when a person speaks, a vibration signal generated by a skin moving along with the human body, and a vibration signal generated by an object in contact with the bone conduction microphone 20 (e.g., a glasses frame or a glasses temple), etc., or any combination thereof.

When the bone conduction microphone 20 works, the external vibration signal may be transmitted to the vibration unit 220 through the housing structure 210, and the vibration unit 220 may vibrate in response to the vibration of the housing structure 210. Since a vibration phase of the vibration unit 220 is different from a vibration phase of the housing structure 210 and a vibration phase of the acoustic transducer 240, the vibrations of the vibration unit 220 may cause a change of a volume of the third acoustic cavity 232, thereby causing a change of a sound pressure of the third acoustic cavity 232. The acoustic transducer 240 may detect the change of the sound pressure of the third acoustic cavity 232 and convert the change of the sound pressure into the electric signal. In some embodiments, the acoustic transducer 240 may include a diaphragm (not shown in FIG. 6). When the sound pressure of the third acoustic cavity 232 changes, the air inside the third acoustic cavity 232 may vibrate. The vibrations of the air may act on the diaphragm such that the diaphragm may deform, and the acoustic transducer 240 may convert the vibration signal of the diaphragm into the electric signal.

In some embodiments, the vibration unit 220 of the above-mentioned bone conduction microphone 20 may be disposed in parallel with a contact surface between the glasses frame or the glasses temple(s) and a user's body. For example, when the bone conduction microphone 20 is disposed on the inner side (i.e., a side of the glasses frame or the glasses temple(s) opposite to the user's body) or the outer side of the glasses frame or the glasses temple(s), the vibration unit 220 may vibrate in a direction perpendicular to the user's body (skin). Since the vibration in the direction perpendicular to the user's body may be transmitted through a contact between the user's body and the glasses temple(s) or the glasses frame, in some embodiments, the vibration unit 220 of the bone conduction microphone 20 may be disposed parallel to the contact surface between the glasses frame or the glasses temple(s) and the user's body. In such cases, the vibration signal may be effectively collected from the user's body, thereby improving the sensitivity of the bone conduction microphone. In some embodiments, the vibration unit 220 of the bone conduction microphone 20 may not be disposed in parallel with the contact surface between the glasses frame or the glasses temple(s) and the user's body. For example, when the bone conduction microphone 20 is disposed on an upper side wall or a lower side wall of the glasses frame or the glasses temple(s), the side of the bone conduction microphone 20 with the vibration unit 220 may be connected to the glasses frame or the glasses temple(s), such that the bone conduction microphone 20 may better receive the vibration signal at the glasses frame or the glasses temple(s).

In some embodiments, the vibration unit 220 of the bone conduction microphone 20 may include a single-axis acceleration sensor or a multi-axis acceleration sensor (e.g., a three-axis acceleration sensor). In some embodiments, the strongest vibration signal in a plurality of directions collected by the multi-axis acceleration sensor may be selected as an input signal of the bone conduction microphone. Optionally, in some embodiments, a stronger input signal may be obtained by performing a weighted sum operation on the vibration signals collected in the plurality of directions by the multi-axis acceleration sensor.

In some embodiments, the glasses may include a plurality of bone conduction microphones 20. In some embodiments, the plurality of bone conduction microphones 20 may be respectively disposed at different positions of the glasses body 10 (e.g., the glasses frame or the glasses temple(s)). For example, in some embodiments, the glasses body 10 may include a first glasses temple and a second glasses temple, and the plurality of bone conduction microphones may include at least one first bone conduction microphone and at least one second bone conduction microphone. The at least one first bone conduction microphone may be disposed on the first glasses temple, and the at least one second bone conduction microphone may be disposed on the second glasses temple. In some embodiments, a plurality of first bone conduction microphones disposed on the first glasses temple and a plurality of second bone conduction microphones disposed on the second glasses temple may be disposed in an array, respectively. It should be noted that, the counts and types of the first bone conduction microphone and the second bone conduction microphone may be the same or different.

In some embodiments, the first bone conduction microphone(s) disposed on the first glasses temple and the second bone conduction microphone(s) disposed on the second glasses temple may have different orientations. For example, the vibration direction of the vibration units in some of the bone conduction microphones may be along a direction perpendicular to the user's body (skin), and the vibration direction of the vibration units in some bone conduction microphones may form a certain angle with the direction perpendicular to the user's body. In such cases, different bone conduction microphones may collect vibration signals in different directions. In some embodiments, the signal with the greatest signal-to-noise ratio (SNR) may be selected as the target signal from the signals collected by the plurality of bone conduction microphones. It should be noted that the positions of the plurality of bone conduction microphones are not limited to the above-mentioned positions on the first glasses temple and second glasses temple, but may also include position(s) on the glasses frame or positions respectively on the glasses frame and the glasses temple.

In some embodiments, the plurality of bone conduction microphones may be wireless bone conduction microphones, and voice signals collected by the bone conduction microphones may be transmitted to other electronic devices through a wireless communication network. In some embodiments, the wireless communication network may include any one of wireless communication manner such as a Bluetooth, infrared, a UWB (ultra-wide band), etc.

Figure 7:
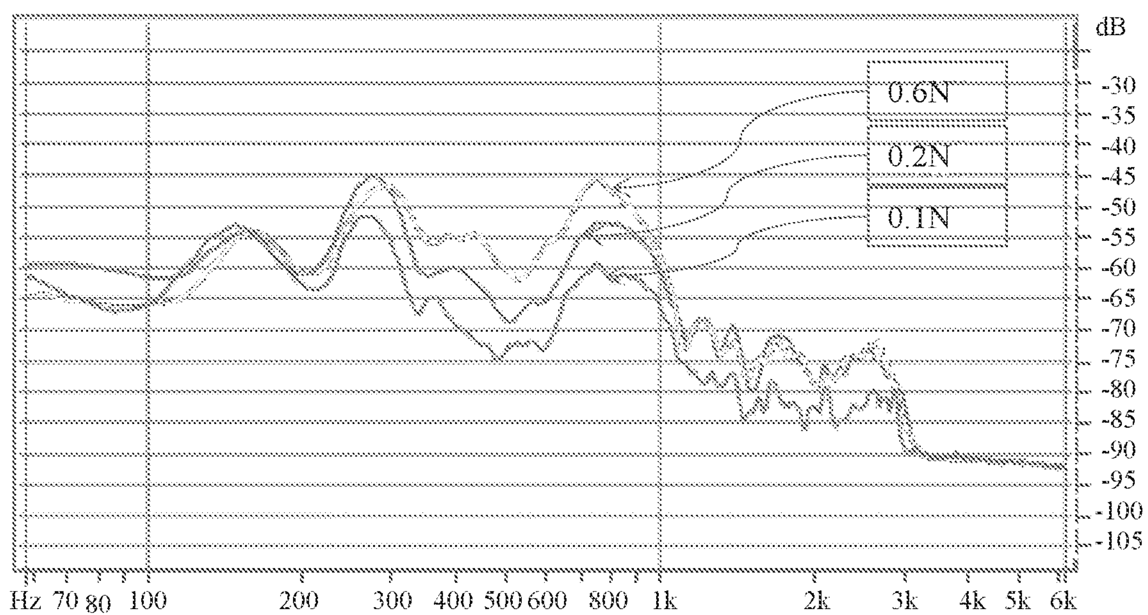
FIG. 7 is a schematic diagram illustrating exemplary frequency response curves of a bone conduction microphone under different pressures according to some embodiments of the present disclosure.

FIG. 7 is a schematic diagram illustrating exemplary frequency response curves of a bone conduction microphone under different pressures according to some embodiments of the present disclosure. A glasses body may include a contact surface that is in direct contact with a user, such as an inner wall of a glasses temple, an inner wall of a glasses frame, an inner wall of a nose pad, etc. In some embodiments, a vibration transmission efficiency between the glasses body and the user's body may be changed by adjusting a clamping force (also referred to as a pressure) between the contact surface of the glasses body and the user's body, thereby adjusting quality of a vibration signal received by the bone conduction microphone on the glasses body. As shown in FIG. 7, in a specific frequency range, when the bone conduction microphone is rigidly connected to the glasses body, the vibration signal received by the bone conduction microphone may increase with an increase of the clamping force between the glasses body (e.g., the glasses frame or the glasses temple(s)) and the user's skin. That is, the vibration signal received by the bone conduction microphone may be positively correlated with the clamping force between the glasses body and the user's skin. The specific frequency range here may include 100 Hz-1000 Hz, or 80 Hz-800 Hz. The specific frequency range may be determined according to specific conditions, which is not limited herein. In some embodiments, the pressure between the contact surface and the human body may be larger than 0.1N. In some embodiments, the pressure between the contact surface and the human body may be larger than 0.2N. In some embodiments, the pressure between the contact surface and the human body may be larger than 0.4N. In some embodiments, the pressure between the contact surface and the human body may be larger than 0.6N. In some embodiments, the pressure between the contact surface and the human body may be larger than 1N. In some embodiments, the clamping force between the contact surface and the user's skin may be adjusted by adjusting a size of the glasses (e.g., a length of the glasses temple(s), a relative distance between two glasses temples), such that the glasses body may transmit the vibration signal of the human body to the bone conduction microphone effectively.

In some embodiments, the contact surface may be a surface of a local region of the glasses frame or the glasses temple(s). In some embodiments, the contact surface may be a surface protruding from the surface of the glasses frame or the glasses temple(s) (also referred to as a "protruding structure"), and the protruding structure may be used as an independent component that contacts the user's body to better acquire the vibration signal of the user's body. The component may be rigidly connected to the glasses temple (s) or the glasses frame, or may be integrally formed. In such cases, an energy loss caused by the vibration signal transmission between the component and the glasses temple(s) or the glasses frame may be reduced. In some embodiments, a height (or thickness) or an elastic coefficient of the protruding structure may be adjusted to adjust the clamping force between the contact surface and the user's body, thereby adjusting the signal quality of the vibration signal of the user's body transmitted to the bone conduction microphone.

In some embodiments, when wearing the glasses, the user may adjust the clamping force between the contact surface between the glasses frame, the glasses temple(s), or the protruding structure and the user's skin by adjusting the relative position of the contact surface to the user's skin, thereby adjusting the signal quality of vibration signal transmitted to the bone conduction microphone, in other words, adjusting a signal collecting effect of the bone conduction microphone.

It should be noted that the above-mentioned values relating to the clamping force are merely provided for the purposes of illustration. In the present disclosure, the clamping force between the contact surface and the user's skin may include, but are limited to, the above-mentioned values. For example, in some embodiments, the clamping force may also be 0.3N, 0.5N, 0.7N, 0.8N, 1.2N, etc., which is not limited herein.

In some embodiments, the bone conduction microphone may be disposed on a side of the glasses temple(s) or glasses frame of the glasses that is in contact with the user's body. When the user wears the glasses, the bone conduction microphone may be in contact with the user's body such that the vibration signal of the user's body, the glasses temple(s) or the glasses frame may be better received. In some embodiments, the bone conduction microphone may be disposed inside the glasses temple(s) or the glasses frame. For example, in some instances, the glasses temple or the glasses frame may include an installation cavity for accommodating the bone conduction microphone, and the bone conduction microphone may be disposed in the installation cavity. One end of the bone conduction microphone that is away from the glasses temple(s) or the glasses frame may protrude relative to the surface of the glasses temple(s) or the glasses frame. That is, one end of the bone conduction microphone may extend out of the installation cavity such that the user may contact the bone conduction microphone when wearing the glasses. By disposing the bone conduction microphone in the installation cavity of the glasses temple(s) or the glasses frame, the volume of the glasses may be reduced, the aesthetics of the glasses may be improved, and an influence of an external noise signal on the signal collected by the bone conduction microphone may be reduced.

In some embodiments, the vibrations of the glasses temple(s) or the glasses frame may include a noise signal (e.g., a noise signal generated by vibrations of the glasses temple(s) or the glasses driven by the noise in the outside air). To reduce the noise signal received by the bone conduction microphone, one end of the bone conduction microphone may be elastically connected to the glasses temple(s) or the glasses frame, the other end of the bone conduction microphone may be in direct contact with the user's body when the user wears the glasses. In such cases, when the user wears glasses, the bone conduction microphone may be in direct contact with the user's body such that the bone conduction microphone may directly collect the vibration signal generated by the user's body when the user speaks. The bone conduction microphone may generate a corresponding electric signal based on the vibration signal. The electric signal may be further processed and then transmitted to an electronic device. In addition, the elastic connection between the bone conduction microphone and the glasses temple(s) or the glasses frame may reduce a connection strength between the bone conduction microphone and the glasses temple(s) or the glasses frame, which may reduce the noise signals transmitted by the glasses temple(s) or the glasses frame.

When the bone conduction microphone is elastically connected to the glasses temple(s) or the glasses frame, a relationship between the vibration of the glasses temple(s) or the glasses frame and the vibration received by the bone conduction microphone may be:

$$\frac{L_1}{L_2} = \frac{-k}{m\omega^2 + j\omega c - k}, \tag{1}$$

where, $L_1$ indicates the vibration received by the bone conduction microphone, $L_2$ indicates the vibration of the glasses temple(s) or the glasses frame, k indicates an elastic strength of the connection between the bone conduction microphone and the glasses temple(s) or the glasses frame, m indicates the quality of the bone conduction microphone, c indicates damping of the connection between the bone conduction microphone and the glasses frames, and $\omega$ indicates an angular frequency.

Figure 8:
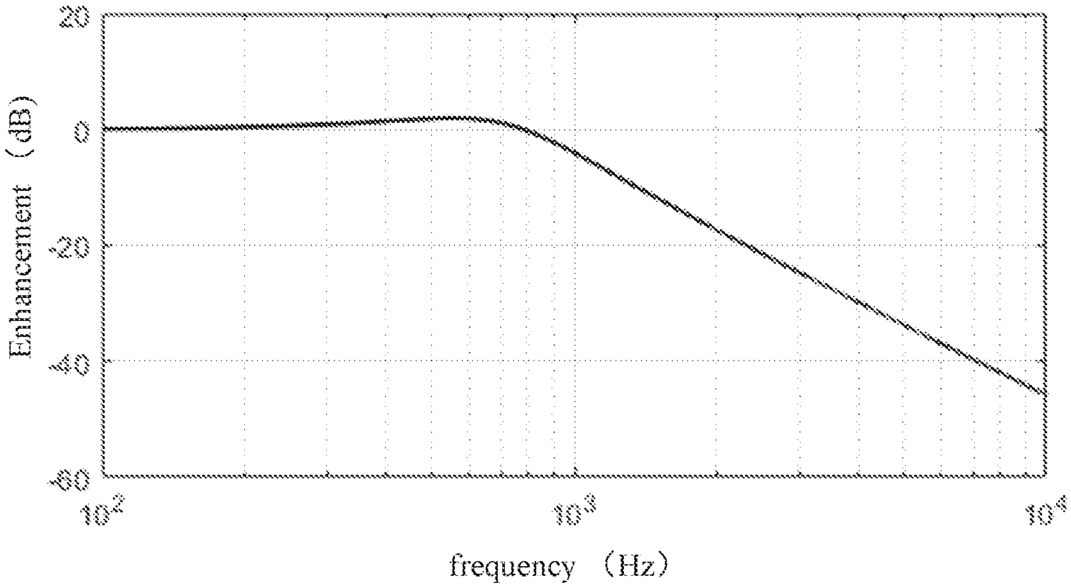
FIG. 8 is a schematic diagram illustrating an exemplary frequency response curve of a bone conduction microphone according to some embodiments of the present disclosure.

FIG. 8 is a schematic diagram illustrating an exemplary frequency response curve of a bone conduction microphone according to some embodiments of the present disclosure. As shown in FIG. 8, when the bone conduction microphone is elastically connected to a glasses temple or a glasses frame, since an elastic layer or an elastic element between the bone conduction microphone and the glasses temple or the glasses frame has a certain degree of flexibility, a resonance peak of the bone conduction microphone may be at a relatively low frequency (e.g., 400 Hz-800 Hz). The bone conduction microphone may have a higher sensitivity to a vibration signal in a relatively low-frequency range (e.g., a frequency range including frequencies lower than a frequency of the resonance peak) than sensitivity to a vibration signal in a relatively high-frequency range (e.g., a frequency range including frequencies larger than 1000 Hz). In such cases, the bone conduction microphone may be not easily affected by a mid-high frequency vibration caused by external noise, but have a high response to the low-frequency signal (i.e., an effective voice signal) transmitted from the user's body to the bone conduction microphone, which may effectively improve an SNR of the bone conduction microphone. In addition, the elastic layer or the elastic element may effectively reduce a value of the resonance peak of the bone conduction microphone, such that the frequency response curve of the bone conduction microphone may be relatively flat, thereby preventing the voice signal collected by the bone conduction microphone from being distorted.

Figure 9:
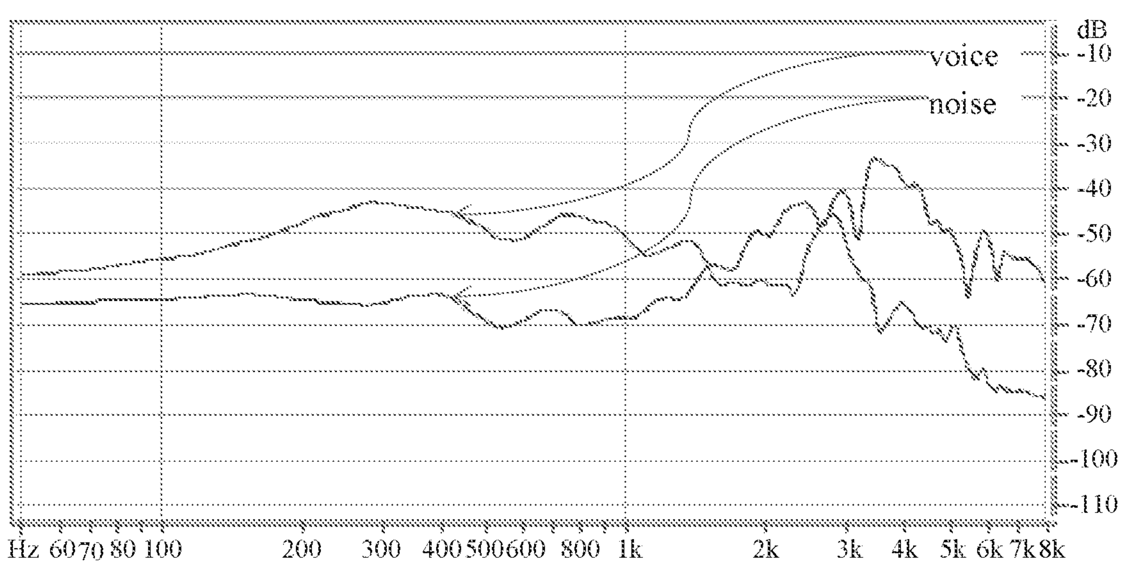
FIG. 9 is a schematic diagram illustrating exemplary frequency response curves of a noise signal and a voice signal received by a bone conduction microphone according to some embodiments of the present disclosure.

In some embodiments, the glasses temple(s) or the glasses frame may include an installation cavity for accommodating the bone conduction microphone. The installation cavity may be disposed inside the glasses temple or the glasses frame. In some embodiments, the glasses temple or the glasses frame may include a protruding structure, and the installation cavity for accommodating the bone conduction microphone may be disposed in the protruding structure, such that when the user wears the glasses, the bone conduction microphone may be in contact with the user's body. FIG. 9 is a schematic diagram illustrating exemplary frequency response curves of a noise signal and a voice signal received by a bone conduction microphone according to some embodiments of the present disclosure. As shown in FIG. 9, the voice signal received by the bone conduction microphone may include more mid-low frequency (e.g., 100 Hz-1000 Hz) components and less high frequency (e.g., 2000 Hz-8000 Hz) components. Distribution of the noise signal received by the bone conduction microphone may be relatively uniform without obvious frequency characteristics. The voice signal may mainly transmit a vibration signal of the user's body. The vibration signal of the user's body may have more components in the mid-low frequency, and may attenuate in the high frequency. With the vibration signal of the user's body as a signal source, the vibration of the glasses frame may have some resonances such that the frequency response curve may include peaks and valleys in some high-frequency bands (e.g., 2500 Hz-4000 Hz). The noise signal mainly transmits air conduction signals of external noise. A receiver of the air conduction signals may be a structure of the glasses (e.g., the glasses frame, lens, the glasses temples, etc.). A wavelength of the air conduction signal may be smaller than the wavelength of the vibration signal of the user's body. In such cases, the received noise signal may include more high-frequency components and less low-frequency components. The installation cavity may isolate the bone conduction microphone from the external noise, thereby improving an SNR of the bone conduction microphone.

According to FIG. 9, in a low-frequency band (e.g., less than 1000 Hz), the voice signal received by the bone conduction microphone may have a high SNR relative to the noise signal. That is, the noise signal received by the bone conduction microphone in the low-frequency band may not affect the quality of the voice signal. In some embodiments, the installation cavity may be used for a physical noise isolation, which may isolate the mid-high frequency (e.g., larger than 1000 Hz-2000 Hz) noise signal and the high frequency (e.g., larger than 2000 Hz) noise signal transmitted by the glasses temple(s) or the glasses frame, thereby improving the SNR of the bone conduction microphone in the mid-high frequency. The physical noise isolation may refer to reducing the noise signal in a specific frequency band (e.g., larger than 1000 Hz) received by the bone conduction microphone. Further, when the user wears the glasses, the user's body may be in a close contact with the glasses temple(s) or the glasses frame, thereby isolating the bone conduction microphone inside the installation cavity from the outside. By disposing the bone conduction microphone in the installation cavity, a contact between the bone conduction microphone and the air may be reduced, which may reduce the noise signal directly transmitted by the air.

In some embodiments, the physical noise isolation requires the bone conduction microphone to be in direct contact with the user's body, and the bone conduction microphone to be elastically connected to the glasses temple (s) or glasses frame. The glasses may have enough space to meet the requirements of the installation cavity used for a bone conduction microphone with an independent structure. For example, the bone conduction microphone may be disposed inside the glasses temple and in direct contact with the user's body. Further, the installation cavity may be applied to other scenarios, for example, an over-ear headphone. The over-ear headphone may have a large space and have several parts in direct contact with the user's body, which enables the over-ear headphone to effectively isolate noise and collect better bone conduction signals.

In some embodiments, an elastic layer may be disposed between the bone conduction microphone and the contact surface of the glasses temple or the glasses frame, or between the bone conduction microphone and a side wall of the installation cavity, so as to realize an elastic connection between the bone conduction microphone and the glasses temple, the glasses frame, or the side wall of the installation cavity. In some embodiments, one side of the elastic layer may be fixedly connected to the glasses temple, the glasses frame or the side wall of the installation cavity, and the other side of the elastic layer may be detachably connected to the bone conduction microphone, so as to facilitate the repair and replacement of the bone conduction microphone. In addition, the user may adjust a pressure between the bone conduction microphone and the user's body according to their own conditions, thereby improving the quality of the vibration signal received by the bone conduction microphone. In some embodiments, a fixed connection here may include, but not limited to, a bonded connection, a welded connection, an embedded connection, etc., and the detachable connection may include, but not limited to, a snap-fit connection, a bolted connection, etc.

The elastic layer may refer to a structure capable of elastic deformation under an action of an external force. In some embodiments, a material of the elastic layer may include, but is not limited to, sponge, rubber, silicone, plastic, foam, etc., or any combination thereof. In some embodiments, the plastic may include, but is not limited to, high molecular weight polyethylene, blow molded nylon, engineering plastics, etc., or any combination thereof. The rubber may refer to other single or composite materials capable of implementing the same performance, including but not limited to general-purpose rubber and special-purpose rubber. In some embodiments, the general-purpose rubber may include, but is not limited to, natural rubber, isoprene rubber, styrene-butadiene rubber, cis-butadiene rubber, neoprene, etc., or any combination thereof. In some embodiments, the special-purpose rubber may include, but is not limited to, nitrile rubber, silicone rubber, fluor rubber, polysulfide rubber, urethane rubber, chlorohydrin rubber, acrylate rubber, propylene oxide rubber, etc., or any combination thereof. The styrene-butadiene rubber may include, but is not limited to, emulsion-polymerized styrene-butadiene rubber and solution-polymerized styrene-butadiene rubber. In some embodiments, the composite materials may include, but are not limited to, reinforcing materials such as glass fiber, carbon fiber, boron fiber, graphite fiber, graphene fibers, silicon carbide fibers, aramid fibers, etc.

Figure 10:
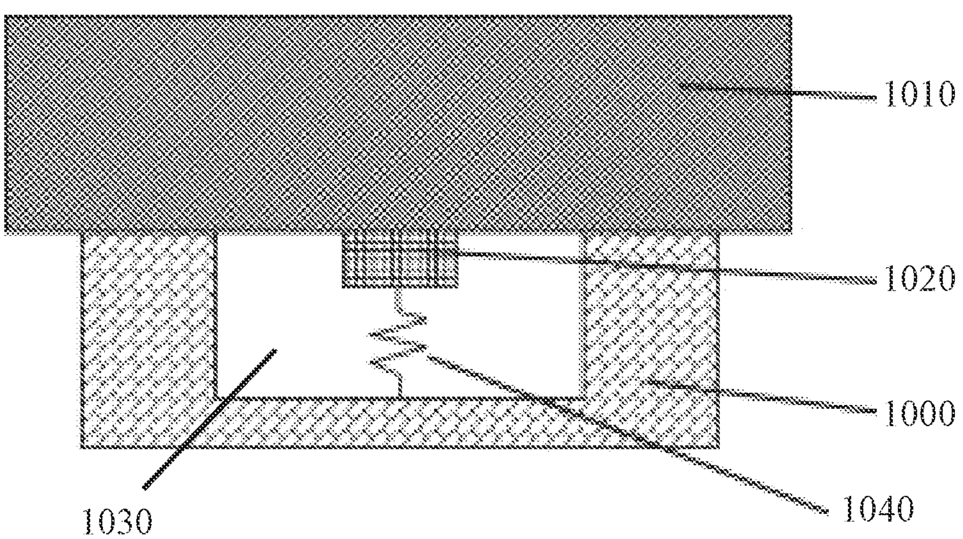
FIG. 10 is a schematic diagram illustrating an exemplary bone conduction microphone in contact with a user's body according to some embodiments of the present disclosure.

FIG. 10 is a schematic diagram illustrating an exemplary bone conduction microphone in contact with a user's body according to some embodiments of the present disclosure. As shown in FIG. 10, in some embodiments, an installation cavity 1030 for accommodating a bone conduction microphone 1020 may be disposed inside a glasses body 1000 (e.g., a glasses frame or a glasses temple(s)). The bone conduction microphone 1020 may be in direct contact with the user's body 1010. The bone conduction microphone 1020 may be elastically connected to a side wall of the cavity where the installation cavity 1030 is disposed through an elastic element (or an elastic layer) 1040. It can be understood that the elastic element (or the elastic layer) 1040 may press the bone conduction microphone 1020 such that the bone conduction microphone may be attached to the user's body. In some embodiments, a pressure between a contact surface of the bone conduction microphone and the user's body may be adjusted by adjusting the elastic element (or the elastic layer) 1040. In some embodiments, the pressure between the contact surface and the user's body may be larger than 0.1N. In some embodiments, the pressure between the contact surface and the user's body may be larger than 0.2N. In some embodiments, the pressure between the contact surface and the user's body may be larger than 0.4N. In some embodiments, the pressure between the contact surface and the user's body may be larger than 0.6N. In some embodiments, the pressure between the contact surface and the user's body may be larger than 1N.

When a user wearing the glasses speaks, a vibration may be generated on the contact surface (e.g., the skin of the user's face) between the bone conduction microphone 1020 and the user's body. The bone conduction microphone 1020 may receive a vibration signal from the contact surface and convert the vibration signal into a corresponding electric signal. In addition, the elastic element (or the elastic layer) 1040 may provide a buffering effect between the bone conduction microphone 1020 and the glasses body 1000, which can effectively reduce an impact of the vibration of the glasses body 1000 on the bone conduction microphone 1020, that is, reduce an effect of a vibration noise of the glasses body 1000 on the bone conduction microphone 1020.

In some embodiments, a vibration unit of the bone conduction microphone 1020 may be disposed in parallel with the contact surface between the user's face and the glasses body 1000 (e.g., the glasses temple(s) or the glasses frame). For example, when the user wearing the glasses speaks, the user's face may mainly generate vibrations perpendicular to the surface of the skin. When the vibration unit of the bone conduction microphone 1020 is disposed in parallel with the contact surface of the user's face, a vibration direction of the vibration unit of the bone conduction microphone 1020 may be parallel to the vibration direction of the user's face, such that the vibration unit may better receive the vibration signal from the user's body. More descriptions regarding the vibration unit may be found elsewhere in the present disclosure. See, e.g., FIG. 6 and relevant descriptions thereof.

Figure 11:
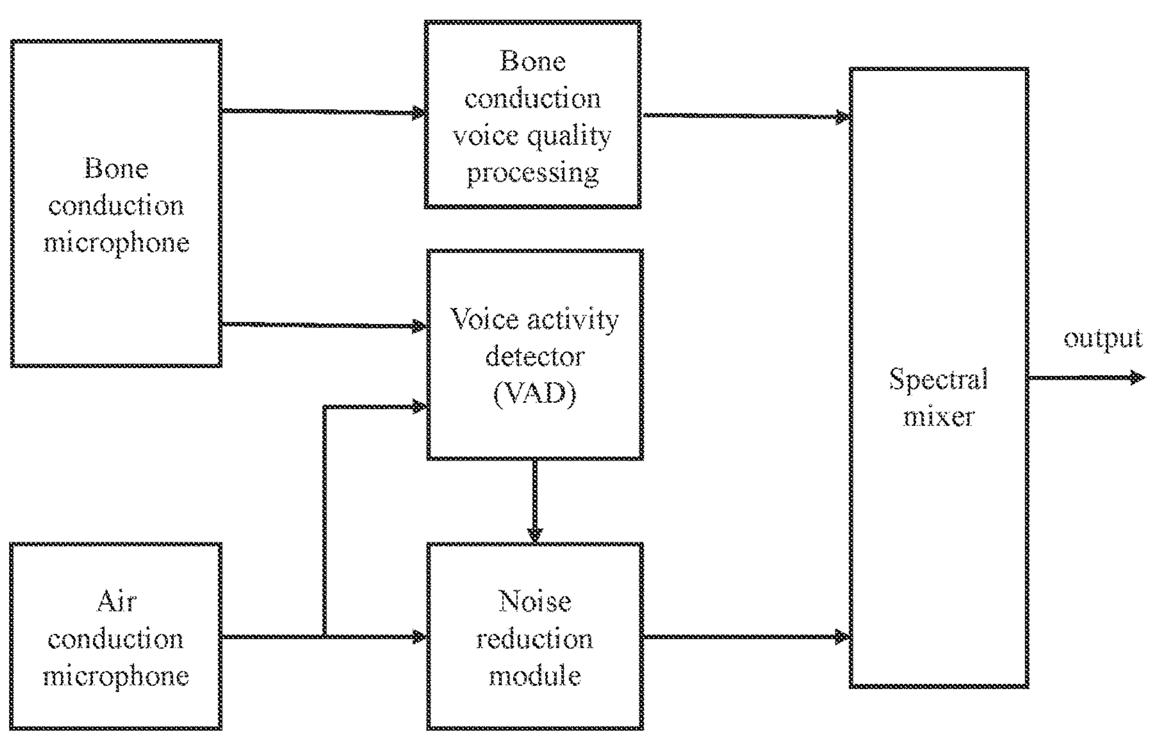
FIG. 11 is a flowchart illustrating an exemplary processing process of the voice signal of the bone conduction microphone according to some embodiments of the present disclosure.

FIG. 11 is a flowchart illustrating an exemplary processing process of the voice signal of the bone conduction microphone according to some embodiments of the present disclosure. As shown in FIG. 11, in some embodiments, when the voice signal (an electric signal) of the bone conduction microphone is processed, a voice activity detection (VAD) operation may be performed on the voice signal of the bone conduction microphone, so as to facilitate a noise reduction process of an overall algorithm. For example, the VAD may accurately determine a start point and an end point of the voice signal from the voice signal including noise, and then remove the noise as an interference signal from original data. When the user wears the glasses, an available frequency band of the voice signal collected by the bone conduction microphone may be about 20 Hz-5000 Hz. The voice signal of the bone conduction microphone may provide more comprehensive VAD information for the overall algorithm of a voice signal processing, thereby improving a noise reduction performance of the overall algorithm. In some embodiments, the glasses may further include an air conduction microphone. In some embodiments, a lower frequency signal of the bone conduction microphone may be spliced with a higher frequency signal of the air conduction microphone, thereby improving the noise reduction performance of the overall algorithm. For example, the available frequency band of the voice signal collected by the traditional bone conduction microphone may be about 20 Hz-1200 Hz, thus a splicing point of the voice signal of the traditional bone conduction microphone and the voice signal of the air conduction microphone may be at about 1000 Hz. According to the combination of the bone conduction microphone and the glasses provided by some embodiments of the present disclosure, the available frequency band of the voice signal collected by the bone conduction microphone may be about 20 Hz-5000 Hz. In such cases, the splicing point of the voice signal of the bone conduction microphone and the voice signal of the air conduction microphone may be at a higher frequency, which may improve the noise reduction performance of the overall algorithm. In some embodiments, the voice signal of the bone conduction microphone may be directly used as a final voice signal after being processed (e.g., a bone conduction voice quality processing). A problem of the voice signal of the bone conduction microphone being directly used as the final voice signal may include that an available frequency band of the voice signal collected by the bone conduction microphone is narrow. For example, the available frequency band of the bone conduction voice signal collected by the true wireless stereo (TWS) may be about 20 Hz-1500 Hz. In addition, the voice quality of the voice signal of the bone conduction microphone may be different from that of the voice signal of the air conduction microphone. Using the voice signal of the bone conduction microphone may seriously degrade the voice quality of the finally output sound. According to the combination of the bone conduction microphone and the glasses provided by some embodiments of the present disclosure, the available frequency band of the voice signal collected by the bone conduction microphone may be expanded. The available frequency band of the voice signal collected by the bone conduction microphone of the glasses may be 20 Hz-5000 Hz, which may include most of the frequency band of the voice signal. In some embodiments, based on a comparison between the voice signals of the bone conduction microphone of the glasses of the present disclosure and that of the air conduction microphone, a parameter (e.g., EQ) of the bone conduction voice quality processing may be adjusted, thereby improving the voice quality of the bone conduction microphone. Optionally, a neural network correlating the voice signal of the bone conduction microphone with the voice signal of the air conduction microphone may be used to "convert" the voice signal of the bone conduction microphone into a corresponding voice signal of the air conduction microphone, which may also solve the problem of voice quality degradation of the bone conduction microphone. In some embodiments, a training of the neural network may be performed individually based on a user. When a user wears the glasses with the bone conduction microphone, the voice quality of the bone conduction microphone after the EQ adjustment or the neural network conversion may be closer to the voice quality of the air conduction microphone. It should be noted that, in the above embodiments, the noise reduction may be performed on both the voice signal of the bone conduction microphone and the voice signal of the air conduction microphone by a noise reduction module. In some embodiments, the voice signal of the bone conduction microphone and/or the voice signal of the air conduction microphone may be processed by a spectral mixer.

In some embodiments, the voice signal of the bone conduction microphone of the glasses may be used as a recognition signal of a specific scene. For example, in a scene with high ambient noise, the voice signal of the bone conduction microphone of the glasses may be used as a switch signal for a keyword recognition. If the user is in an environment with constant noise, the microphone (e.g., the bone conduction microphone, the air conduction microphone) and the corresponding algorithm need to be kept on, which may result in high power consumption of the microphones. Since the bone conduction microphone mainly receives the vibration signal of the vibrations of the user's body when the user speaks, and the noise of the external environment has little influence on the bone conduction microphone, using the voice signal of the bone conduction microphone as a switch signal for the voice recognition may reduce the effect of the external noise and make the switching function more accurate.

In some embodiments, the voice signal of the bone conduction microphone of the glasses may also be used for a voiceprint recognition. For example, in a noisy environment, the bone conduction microphone of the glasses mainly receives the vibration signal of the vibrations of the user's body when the user speaks. When the user wears the glasses with the bone conduction microphone, the available frequency band of the bone conduction microphone may be expanded to be 20 Hz-5000 Hz. The frequency band may include most of the frequency bands of the voice. Using the voice signal of the bone conduction microphone as a signal source of the voiceprint recognition may improve the accuracy of the voiceprint recognition.

Figure 12:
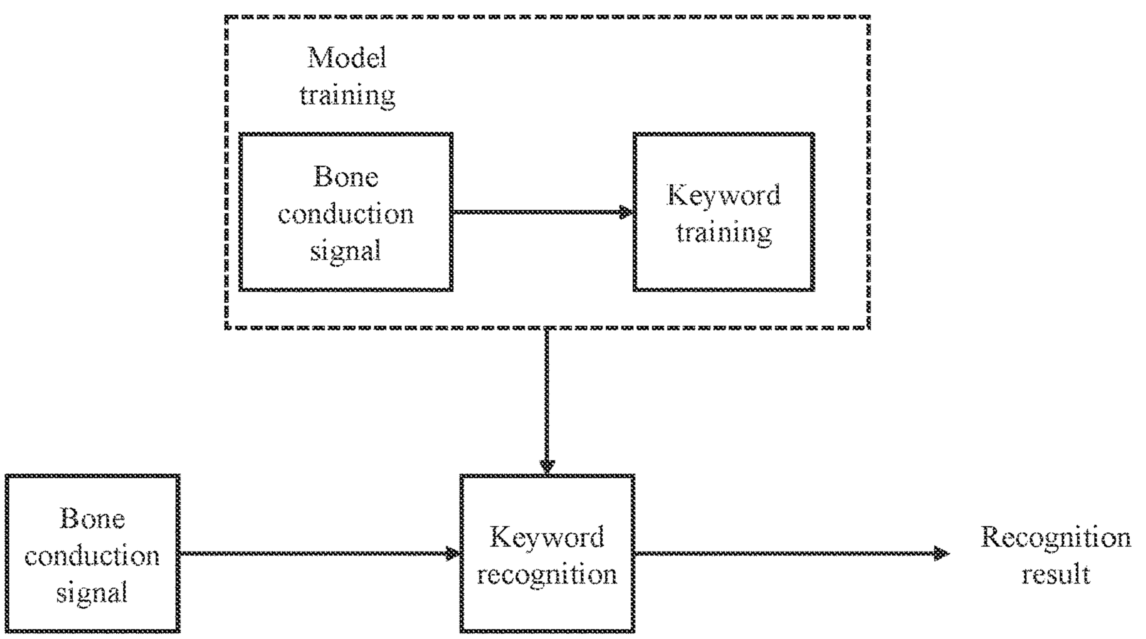
FIG. 12 is a flowchart illustrating an exemplary process for training a voice model according to some embodiments of the present disclosure.

In some embodiments, the voice signal of the bone conduction microphone of the glasses may also be used for the voice recognition. For example, in the noisy environment, especially in an environment with a lot of people-talking noise, the accuracy of the voice recognition using the voice signal of the traditional air conduction microphone may decrease. The voice signal of the bone conduction microphone may be used as the signal source for the voice recognition such that the external noise may be shielded to a certain extent, thereby obtaining a clearer voice signal. When the user wears the glasses with the bone conduction microphone, the available frequency band of the bone conduction microphone may be expanded to be 20 Hz-5000 Hz, which may include most of the frequency bands of the voice. The accuracy of the voice recognition performed based on the voice signal of the bone conduction microphone may be improved accordingly. In other embodiments, the voice signal of the bone conduction microphone and the voice signal of the air conduction microphone may be combined and used as the signal source for the voice recognition. For example, when the voice recognition is performed based on a separate voice signal of the bone conduction microphone, a voice model relating to the voice signal of the bone conduction microphone may be separately trained. As another example, when the voice recognition is performed based on the voice signals of the bone conduction microphone and the air conduction microphone, the voice model relating to the voice signal of the bone conduction microphone may be trained separately, or the voice model relating to the voice signal of the air conduction microphone may be trained separately, or a voice model relating to the voice signal of the bone conduction microphone and the voice signal of the air conduction microphone may be trained simultaneously. As shown in FIG. 12, a corresponding voice model may be obtained according to a model training operation performed based on the voice signal of the bone conduction microphone (the "bone conduction signal" shown in FIG. 12). The voice model may be used for a keyword training. After the model training operation is completed, a recognition result corresponding to the bone conduction signal may be obtained by performing, based on the bone conduction signal, a keyword recognition.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. Glasses, comprising:

a glasses body, including a glasses frame and two glasses temples, wherein the two glasses temples are physically connected to the glasses frame, respectively; and at least one bone conduction microphone configured to convert a vibration signal into an electric signal, wherein the at least one bone conduction microphone is physically connected to the glasses frame or at least one glasses temple of the two glasses temples, and the at least one bone conduction microphone is configured to receive vibration signals from the glasses frame, the at least one glasses temple or a user's body, wherein the glasses body includes an installation cavity for accommodating the at least one bone conduction microphone, one end of the at least one bone conduction microphone extends out of the installation cavity, another end of the at least one bone conduction microphone is elastically connected to a side wall of the installation cavity through an elastic element, the elastic element is configured to press the at least one bone conduction microphone to directly contact the user, a pressure of the at least one bone conduction microphone on the user's body is larger than 0.1 N, the two glasses temples include a first glasses temple and a second glasses temple, and the at least one bone conduction microphone includes at least one first bone conduction microphone and at least one second bone conduction microphone; the at least one first bone conduction microphone is disposed on the first glasses temple, the at least one second bone conduction microphone is disposed on the second glasses temple, the at least one first bone conduction microphone and the at least one second bone conduction microphone have different orientations, a vibration direction of a vibration unit in the at least one first bone conduction microphone is arranged along a direction perpendicular to the user's body, and a vibration direction of a vibration unit in the at least one second bone conduction microphone and the direction perpendicular to the user's body form a certain angle.

2. The glasses of claim 1, wherein a vibration unit of the at least one bone conduction microphone is a single-axis acceleration sensor or a multi-axis acceleration sensor.

3. The glasses of claim 2, wherein an input signal of the at least one bone conduction microphone is a weighted sum operation on the vibration signals collected in a plurality of directions by the multi-axis acceleration sensor.

4. The glasses of claim 1, wherein the at least one first bone conduction microphone and the at least one second bone conduction microphone are both wireless bone conduction microphones.

5. The glasses of claim 1, wherein when the user wears the glasses, the at least one bone conduction microphone is in contact with the user's body such that the at least one bone conduction microphone receives the vibration signal of the user's body.

6. The glasses of claim 1, further comprising:

a bone conduction speaker connected to an end of one glasses temple through a hinge assembly, wherein the bone conduction speaker is configured to attach to a back of the user's ear, and the at least one bone conduction microphone is positioned before the user's ear.

* * * * *